US010977285B2

(12) United States Patent
Monaco et al.

(10) Patent No.: US 10,977,285 B2
(45) Date of Patent: Apr. 13, 2021

(54) USING OBSERVATIONS OF A PERSON TO DETERMINE IF DATA CORRESPONDS TO THE PERSON

(71) Applicant: VERIZON MEDIA INC., New York, NY (US)

(72) Inventors: Peter Monaco, Los Altos, CA (US); Richard Earle Seeger, III, Pacifica, CA (US)

(73) Assignee: VERIZON MEDIA INC., New York, NY (US)

( * ) Notice: Subject to any disclaimer, the term of this patent is extended or adjusted under 35 U.S.C. 154(b) by 133 days.

(21) Appl. No.: 13/797,285

(22) Filed: Mar. 12, 2013

(65) Prior Publication Data

US 2013/0262477 A1    Oct. 3, 2013

Related U.S. Application Data

(60) Provisional application No. 61/616,486, filed on Mar. 28, 2012.

(51) Int. Cl.
*G06F 16/00* (2019.01)
*G06F 16/33* (2019.01)
*G06F 16/25* (2019.01)

(52) U.S. Cl.
CPC ........ *G06F 16/3344* (2019.01); *G06F 16/254* (2019.01)

(58) Field of Classification Search
CPC .................................................... G06F 16/221
USPC ........................................................ 707/693
See application file for complete search history.

(56) References Cited

U.S. PATENT DOCUMENTS

| 5,396,647 A | 3/1995 | Thompson et al. |
| 5,610,915 A | 3/1997 | Elliott et al. |
| 5,966,714 A | 10/1999 | Huang et al. |
| 6,020,884 A | 2/2000 | MacNaughton et al. |
| 6,285,999 B1 | 9/2001 | Page |
| 6,385,644 B1 | 5/2002 | Devine et al. |

(Continued)

FOREIGN PATENT DOCUMENTS

| EP | 0944002 | 9/1999 |
| JP | 2003006116 | 10/2003 |

(Continued)

OTHER PUBLICATIONS

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

(Continued)

*Primary Examiner* — Anhtai V Tran
(74) *Attorney, Agent, or Firm* — James J. DeCarlo; Greenberg Traurig, LLP

(57) ABSTRACT

Systems and methods to store data obtained from observations and to determine a correspondence of certain data to a particular person. In one approach, a method includes: receiving or making a plurality of observations for a person (e.g., data extracted from e-mails sent to the person); storing the observations in a repository (e.g., a database on a server); and determining whether data in a first observation of the observations corresponds to the person, wherein the determining is based on the plurality of observations.

19 Claims, 14 Drawing Sheets

(56) References Cited

U.S. PATENT DOCUMENTS

| | | |
|---|---|---|
| 6,484,196 B1 | 11/2002 | Maurille |
| 6,510,453 B1 | 1/2003 | Apfei et al. |
| 6,560,620 B1 | 5/2003 | Ching |
| 6,594,654 B1 | 7/2003 | Salam et al. |
| 6,721,748 B1 | 4/2004 | Knight et al. |
| 6,816,850 B2 | 11/2004 | Culliss |
| 6,832,245 B1 | 12/2004 | Isaacs et al. |
| 6,931,419 B1 | 8/2005 | Lindquist |
| 6,952,805 B1 | 10/2005 | Tafoya et al. |
| 6,996,777 B2 | 2/2006 | Hiipakka |
| 7,003,724 B2 | 2/2006 | Newman |
| 7,058,892 B1 | 6/2006 | MacNaughton et al. |
| 7,076,533 B1 | 7/2006 | Knox et al. |
| 7,085,745 B2 | 8/2006 | Klug |
| 7,103,806 B1 | 9/2006 | Horvitz |
| 7,181,518 B1 | 2/2007 | Matsumoto et al. |
| 7,185,065 B1 | 2/2007 | Holtzman et al. |
| 7,246,045 B1 | 7/2007 | Rappaport et al. |
| 7,328,242 B1 | 2/2008 | McCarthy et al. |
| 7,333,976 B1 * | 2/2008 | Auerbach ......... G06F 17/30958 |
| 7,359,894 B1 | 4/2008 | Liebman et al. |
| 7,383,307 B2 | 6/2008 | Kirkland et al. |
| 7,444,323 B2 | 10/2008 | Martinez et al. |
| 7,475,109 B1 | 1/2009 | Fletcher et al. |
| 7,475,113 B2 | 1/2009 | Stolze |
| 7,512,788 B2 | 3/2009 | Choi et al. |
| 7,512,814 B2 | 3/2009 | Chen et al. |
| 7,536,384 B2 | 5/2009 | Venkataraman et al. |
| 7,539,676 B2 | 5/2009 | Aravamudan |
| 7,580,363 B2 | 8/2009 | Sorvari et al. |
| 7,593,995 B1 | 9/2009 | He et al. |
| 7,620,407 B1 | 11/2009 | Donald et al. |
| 7,624,103 B2 | 11/2009 | Wiegering et al. |
| 7,627,598 B1 | 12/2009 | Burke |
| 7,634,463 B1 | 12/2009 | Katragadda et al. |
| 7,639,157 B1 | 12/2009 | Whitley et al. |
| 7,653,695 B2 | 1/2010 | Flury et al. |
| 7,692,653 B1 | 4/2010 | Petro et al. |
| 7,702,730 B2 | 4/2010 | Spataro et al. |
| 7,707,249 B2 | 4/2010 | Spataro et al. |
| 7,707,509 B2 | 4/2010 | Naono et al. |
| 7,716,140 B1 | 5/2010 | Nielsen et al. |
| 7,720,916 B2 | 5/2010 | Fisher et al. |
| 7,725,492 B2 | 5/2010 | Sittig |
| 7,743,051 B1 | 6/2010 | Kashyap et al. |
| 7,752,081 B2 | 7/2010 | Calabria |
| 7,756,895 B1 | 7/2010 | Emigh |
| 7,756,935 B2 | 7/2010 | Gaucas |
| 7,761,436 B2 | 7/2010 | Norton et al. |
| 7,788,260 B2 | 8/2010 | Lunt |
| 7,805,492 B1 | 9/2010 | Thatcher et al. |
| 7,818,396 B2 | 10/2010 | Dolin et al. |
| 7,827,208 B2 | 11/2010 | Bosworth |
| 7,827,265 B2 | 11/2010 | Cheever et al. |
| 7,831,692 B2 | 11/2010 | French et al. |
| 7,836,045 B2 | 11/2010 | Schachter |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,870,197 B2 | 1/2011 | Lewis et al. |
| 7,899,806 B2 | 3/2011 | Aravamudan |
| 7,899,871 B1 | 3/2011 | Kumar et al. |
| 7,908,647 B1 | 3/2011 | Polis et al. |
| 7,949,627 B2 | 5/2011 | Aravamudan |
| 7,970,832 B2 | 6/2011 | Perry et al. |
| 7,979,569 B2 | 7/2011 | Eisner et al. |
| 7,991,764 B2 | 8/2011 | Rathod |
| 7,996,456 B2 | 8/2011 | Gross |
| 8,005,806 B2 | 8/2011 | Rupp et al. |
| 8,032,598 B1 | 10/2011 | He et al. |
| 8,055,715 B2 | 11/2011 | Bensky et al. |
| 8,073,928 B2 | 12/2011 | Dolin et al. |
| 8,086,676 B2 | 12/2011 | Palahnuk et al. |
| 8,112,437 B1 | 2/2012 | Katragadda et al. |
| 8,140,566 B2 | 3/2012 | Boerries et al. |
| 8,161,122 B2 | 4/2012 | Sood et al. |
| 8,200,808 B2 | 6/2012 | Ishida |
| 8,204,897 B1 | 6/2012 | Djabarov et al. |
| 8,284,783 B1 | 10/2012 | Maufer et al. |
| 8,291,019 B2 | 10/2012 | Rochelle et al. |
| 8,296,179 B1 | 10/2012 | Rennison |
| 8,316,315 B2 | 11/2012 | Portnoy et al. |
| 8,392,409 B1 | 3/2013 | Kashyap et al. |
| 8,392,836 B1 | 3/2013 | Bau et al. |
| 8,423,545 B2 | 4/2013 | Cart et al. |
| 8,443,441 B2 | 5/2013 | Stolfo et al. |
| 8,452,745 B2 | 5/2013 | Ramakrishna |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Breztria et al. |
| 8,566,306 B2 | 10/2013 | Jones |
| 8,600,343 B2 | 12/2013 | Brezina et al. |
| 8,620,935 B2 | 12/2013 | Rubin et al. |
| 8,661,002 B2 | 2/2014 | Smith et al. |
| 8,745,060 B2 | 6/2014 | Brezina et al. |
| 8,793,625 B2 | 7/2014 | Rhee et al. |
| 8,818,995 B1 | 8/2014 | Guha |
| 9,009,065 B2 | 4/2015 | Reis et al. |
| 9,020,938 B2 | 4/2015 | Cort et al. |
| 9,058,366 B2 | 6/2015 | Brezina et al. |
| 9,069,825 B1 | 6/2015 | Chang |
| 9,195,969 B2 | 11/2015 | Bau et al. |
| 9,235,848 B1 | 1/2016 | Gourley et al. |
| 9,275,118 B2 | 3/2016 | Brezina et al. |
| 9,298,783 B2 | 3/2016 | Brezina et al. |
| 9,591,086 B2 | 3/2017 | Brezina et al. |
| 9,596,308 B2 | 3/2017 | Brezina et al. |
| 9,699,258 B2 | 7/2017 | Brezina et al. |
| 9,716,764 B2 | 7/2017 | Brezina et al. |
| 9,842,144 B2 | 12/2017 | Cort et al. |
| 9,842,145 B2 | 12/2017 | Cort et al. |
| 9,954,963 B2 | 4/2018 | Brezina et al. |
| 10,013,672 B2 | 7/2018 | Seeger et al. |
| 10,069,924 B2 | 9/2018 | Brezina et al. |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0112014 A1 * | 8/2002 | Bennett ................ H04W 4/14 709/206 |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0046311 A1 | 3/2003 | Baidya et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0167324 A1 | 9/2003 | Farnham et al. |
| 2003/0195937 A1 | 10/2003 | Kircher, Jr. et al. |
| 2003/0204439 A1 | 10/2003 | Cullen |
| 2003/0220978 A1 | 11/2003 | Rhodes |
| 2003/0220989 A1 | 11/2003 | Tsuji et al. |
| 2003/0233419 A1 | 12/2003 | Beringer |

(56) References Cited

U.S. PATENT DOCUMENTS

| | | |
|---|---|---|
| 2004/0002903 A1 | 1/2004 | Stolfo et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133465 A1 | 7/2004 | Koge et al. |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0215726 A1 | 10/2004 | Arning et al. |
| 2004/0260756 A1 | 12/2004 | Forstall et al. |
| 2004/0268229 A1 | 12/2004 | Paoli et al. |
| 2005/0015626 A1* | 1/2005 | Chasin ............... H04L 63/0245 726/4 |
| 2005/0027779 A1 | 2/2005 | Schinner |
| 2005/0038687 A1 | 2/2005 | Galdes |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0080868 A1 | 4/2005 | Malik |
| 2005/0091203 A1 | 4/2005 | Liu et al. |
| 2005/0091272 A1 | 4/2005 | Smith et al. |
| 2005/0091314 A1 | 4/2005 | Blagsvedt et al. |
| 2005/0091319 A1* | 4/2005 | Kirsch .......................... 709/206 |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0204009 A1 | 9/2005 | Hazarika et al. |
| 2005/0213511 A1 | 9/2005 | Reece et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004713 A1 | 1/2006 | Korte et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0015561 A1 | 1/2006 | Murphy et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064434 A1 | 3/2006 | Gilbert et al. |
| 2006/0065733 A1 | 3/2006 | Lee et al. |
| 2006/0075046 A1 | 4/2006 | Yozell-Epstein et al. |
| 2006/0083357 A1 | 4/2006 | Howell et al. |
| 2006/0083358 A1 | 4/2006 | Fong et al. |
| 2006/0085752 A1 | 4/2006 | Beadle et al. |
| 2006/0095502 A1 | 5/2006 | Lewis et al. |
| 2006/0101285 A1 | 5/2006 | Chen et al. |
| 2006/0101350 A1 | 5/2006 | Scott |
| 2006/0123357 A1 | 6/2006 | Okamura |
| 2006/0136494 A1 | 6/2006 | Oh |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassell et al. |
| 2006/0224675 A1 | 10/2006 | Fox et al. |
| 2006/0242536 A1 | 10/2006 | Gogerty |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0060328 A1 | 3/2007 | Zeike et al. |
| 2007/0061300 A1 | 3/2007 | Ramer et al. |
| 2007/0067289 A1 | 3/2007 | Novak |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118533 A1 | 5/2007 | Ramer et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0156732 A1 | 7/2007 | Surendran et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0185865 A1 | 8/2007 | Budzik et al. |
| 2007/0192490 A1 | 8/2007 | Minhas |
| 2007/0203991 A1 | 8/2007 | Fisher et al. |
| 2007/0208802 A1 | 9/2007 | Barman et al. |
| 2007/0214141 A1 | 9/2007 | Sittig |
| 2007/0218900 A1 | 9/2007 | Abhyanker |
| 2007/0244681 A1 | 10/2007 | Wan Kyu Cha et al. |
| 2007/0255794 A1 | 11/2007 | Coutts |
| 2007/0271527 A1 | 11/2007 | Paas et al. |
| 2007/0273517 A1 | 11/2007 | Govind |
| 2007/0282956 A1 | 12/2007 | Staats |
| 2007/0288514 A1 | 12/2007 | Reitter et al. |
| 2007/0288578 A1 | 12/2007 | Pantalone |
| 2007/0294281 A1 | 12/2007 | Ward et al. |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |

(56) References Cited

U.S. PATENT DOCUMENTS

| | | |
|---|---|---|
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0133540 A1 | 6/2008 | Hubbard et al. |
| 2008/0147639 A1 | 6/2008 | Hartman et al. |
| 2008/0147810 A1 | 6/2008 | Kumar et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0268882 A1* | 10/2008 | Moloney ............... H04L 51/18 455/466 |
| 2008/0270939 A1 | 10/2008 | Mueller |
| 2008/0275748 A1 | 11/2008 | John |
| 2008/0290987 A1 | 11/2008 | Li |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |
| 2008/0316925 A1 | 12/2008 | Dolin et al. |
| 2009/0005076 A1 | 1/2009 | Forstall |
| 2009/0010353 A1 | 1/2009 | She et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0048994 A1 | 2/2009 | Applebaum et al. |
| 2009/0054091 A1 | 2/2009 | van Wijk et al. |
| 2009/0063130 A1 | 3/2009 | Moore |
| 2009/0070412 A1 | 3/2009 | D'Angelo |
| 2009/0077026 A1 | 3/2009 | Yanagihara |
| 2009/0106415 A1 | 4/2009 | Brezina et al. |
| 2009/0106676 A1 | 4/2009 | Brezina et al. |
| 2009/0106695 A1* | 4/2009 | Perry .................... G06F 17/24 715/816 |
| 2009/0111495 A1 | 4/2009 | Sjolin et al. |
| 2009/0119678 A1 | 5/2009 | Shih et al. |
| 2009/0150251 A1 | 6/2009 | Zhitomirsky |
| 2009/0156170 A1 | 6/2009 | Rossano et al. |
| 2009/0157717 A1 | 6/2009 | Palahnuk et al. |
| 2009/0171930 A1 | 7/2009 | Vaughan et al. |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0213088 A1 | 8/2009 | Hardy et al. |
| 2009/0228555 A1 | 9/2009 | Joviak et al. |
| 2009/0234815 A1 | 9/2009 | Boerries et al. |
| 2009/0249198 A1 | 10/2009 | Davis et al. |
| 2009/0271370 A1 | 10/2009 | Jagadish et al. |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2010/0009332 A1 | 1/2010 | Yaskin et al. |
| 2010/0030715 A1 | 2/2010 | Eustice et al. |
| 2010/0049534 A1 | 2/2010 | Whitnah |
| 2010/0057859 A1 | 3/2010 | Shen et al. |
| 2010/0062753 A1 | 3/2010 | Wen et al. |
| 2010/0077041 A1 | 3/2010 | Cowan et al. |
| 2010/0082693 A1 | 4/2010 | Hugg et al. |
| 2010/0094869 A1 | 4/2010 | Ebanks |
| 2010/0131447 A1 | 5/2010 | Creutz et al. |
| 2010/0153832 A1 | 6/2010 | Markus et al. |
| 2010/0161729 A1 | 6/2010 | Leblanc et al. |
| 2010/0164957 A1 | 7/2010 | Lindsay |
| 2010/0169327 A1 | 7/2010 | Lindsay |
| 2010/0174784 A1 | 7/2010 | Levey et al. |
| 2010/0185610 A1 | 7/2010 | Lunt |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard |
| 2010/0235375 A1 | 9/2010 | Sidhu et al. |
| 2010/0241579 A1 | 9/2010 | Bassett et al. |
| 2010/0241639 A1 | 9/2010 | Kifer et al. |
| 2010/0250682 A1 | 9/2010 | Goldberg et al. |
| 2010/0275128 A1 | 10/2010 | Ward et al. |
| 2010/0281535 A1 | 11/2010 | Perry et al. |
| 2010/0306185 A1* | 12/2010 | Smith .................. G06Q 10/107 707/709 |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0066615 A1 | 3/2011 | Pradhan et al. |
| 2011/0087747 A1* | 4/2011 | Hirst .................... G06Q 10/107 709/206 |
| 2011/0087969 A1 | 4/2011 | Hein et al. |
| 2011/0098846 A1 | 4/2011 | Yeung et al. |
| 2011/0145192 A1 | 6/2011 | Quintela et al. |
| 2011/0145219 A1 | 6/2011 | Cierniak et al. |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0196802 A1 | 8/2011 | Ellis et al. |
| 2011/0202532 A1 | 8/2011 | Nakazawa et al. |
| 2011/0225173 A1 | 9/2011 | Gulhane et al. |
| 2011/0225293 A1 | 9/2011 | Rathod |
| 2011/0276396 A1 | 11/2011 | Rathod |
| 2011/0282905 A1 | 11/2011 | Polis et al. |
| 2011/0291933 A1 | 12/2011 | Holzer |
| 2011/0298701 A1 | 12/2011 | Holzer |
| 2012/0011204 A1 | 1/2012 | Morin et al. |
| 2012/0017158 A1 | 1/2012 | Maguire et al. |
| 2012/0036254 A1 | 2/2012 | Onuma |
| 2012/0054681 A1 | 3/2012 | Cort et al. |
| 2012/0078883 A1 | 3/2012 | Melby |
| 2012/0150979 A1 | 6/2012 | Monaco |
| 2012/0232955 A1* | 9/2012 | Riazzi ................... G06Q 30/02 705/7.32 |
| 2012/0246065 A1 | 9/2012 | Yarvis et al. |
| 2012/0259834 A1 | 10/2012 | Broder et al. |
| 2013/0006634 A1* | 1/2013 | Grokop et al. ............... 704/245 |
| 2013/0014021 A1 | 1/2013 | Bau et al. |
| 2013/0080915 A1 | 3/2013 | Lewis et al. |
| 2013/0091288 A1 | 4/2013 | Shalunov et al. |
| 2014/0087687 A1 | 3/2014 | Brezina et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0129569 A1 | 5/2014 | Seeger, III et al. |
| 2014/0207761 A1 | 7/2014 | Brezina et al. |
| 2014/0214981 A1 | 7/2014 | Mallet et al. |
| 2014/0280094 A1 | 9/2014 | Brandstetter |
| 2014/0280097 A1 | 9/2014 | Lee et al. |
| 2014/0287786 A1 | 9/2014 | Bayraktar et al. |
| 2016/0070787 A1 | 3/2016 | Brezina et al. |
| 2016/0182661 A1 | 6/2016 | Brezina et al. |
| 2017/0187663 A1 | 6/2017 | Brezina et al. |
| 2017/0302749 A1 | 10/2017 | Brezina et al. |
| 2017/0324821 A1 | 11/2017 | Brezina et al. |
| 2018/0095970 A1 | 4/2018 | Cort et al. |

(56) References Cited

U.S. PATENT DOCUMENTS

| | | | |
|---|---|---|---|
| 2018/0234513 | A1 | 8/2018 | Brezina et al. |
| 2018/0276615 | A1 | 9/2018 | Seeger, III et al. |
| 2018/0359325 | A1 | 12/2018 | Brezina et al. |

FOREIGN PATENT DOCUMENTS

| | | |
|---|---|---|
| JP | 2007249307 | 9/2007 |
| KR | 1020040031113 | 4/2004 |
| KR | 20060056015 | 5/2006 |
| KR | 1020090068819 | 6/2009 |
| KR | 20090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Carvalho, Vitor R. et al., "Ranking Users for Intelligent Message Addressing," Proceedings of the 30th European Conference on Information Retrieval, Glasgow, Engand, Mar. 30-Apr. 3, 2008, pp. 321-333.
Elsayed, Tamer et al., "Personal Name Resolution in Email: A Heuristic Approach," University of Maryland Technical Report No. TR-LAMP-150, Mar. 17. 2008.
International Patent Application PCT/US10/34782, International Search Report and Written Opinion, dated Dec. 22, 2010.
International Patent Application PCT/US10/35405, International Search Report and Written Opinion, dated Jan. 3, 2011.
International Patent Application PCT/US12/043523, International Search Report and Written Opinion, dated Nov. 28, 2012.
Microsoft Corporation, "About AutoCoroplete Name Suggesting," Microsoft Outlook 2003 help forum, located at http://office.microsoft.com/en-us/outlook/HP063786471033.aspx, 2003.
Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).
Culotta, Aron et al., "Extracting Social Networks and Contact Information from Email and the Web," Proceedings pf the First Conference on Email and Anti-Spam (CEAS), Mountain View, CA, Jul. 30-31, 2004 (document provided includes third-party comments submitted under the USPTO PeerToPatent program).
European Patent Application No. 11849271.9, Extended Search Report, dated Apr. 3, 2014.
European Patent Application No. 12801970.0, Extended Search Report, dated Oct. 23, 2014.
European Patent Application 12801998.1, Extended Search Report, dated Feb. 10, 2015.
Extended European Search Report, EP 10 78 3783, dated Mar. 24, 2014.
Fitzpatrick, Brad, "AddressBooker," Github Social Coding, located at http://addressbooker.appspot.com/, Nov. 28, 2008 (document provided includes third-party comments submitted under the USPTO PeerToPatent program).
Google Inc. "OpenSocial Tutorial," located at http://code.google.com/apis/opensocial/articles/tutorial/tutorial-0.8.html, Aug. 2008.
Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).
Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).
International Patent Application PCT/US10/52081, International Search Report and Written Opinion, dated May 20, 2011.
International Patent Application PCT/US10/56560, International Search Report and Written Opinion, dated Jun. 21, 2011.
International Patent Application PCT/US11/64958, International Search Report and Written Opinion, dated Jul. 31, 2012.
International Patent Application PCT/US2011/064892, International Search Report and Written Opinion, dated Aug. 22, 2012.
International Patent Application PCT/US2012/043507, International Search Report and Written Opinion, dated Jan. 3, 2013.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
OpenSocial Foundation, "Social Application Tutorial (v0.9)," located at http://wiki.opensocial.org/index.php? title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.
International Patent Application PCT/US10/34782, Written Opinion, dated Dec. 22, 2010.

* cited by examiner

Crowdsourcing Outbound

Don't have complete phone number information on Xobni user X, but can infer more complete data based on emails sent.

Crowdsourcing Inbound

Can figure out phone numbers of non-Xobni users (in this case user A) by the emails received by existing Xobni users (X, Y, and Z).

Sample Observation Parsing

```
From: rick@gmail.com
To: jason@yahoo.com
Subject: London

Dear Jason,

I moved to London, my new cell is (011)44 0845-430-7676.   <-- extracted (CORRECT #)
My address is Box 1277-23, 745 Hamstead Road.              <-- not extracted
Also, my brother just got married, you should give
him a call sometime at his home 650-123-4567               <-- extracted (INCORRECT #)

Cheers,
Rick
```

FIG. 3

Examples (via high-security interface)

FIG. 7

USING OBSERVATIONS OF A PERSON TO DETERMINE IF DATA CORRESPONDS TO THE PERSON

CROSS-REFERENCE TO RELATED APPLICATIONS

The present application claims priority to U.S. Provisional Application Ser. No. 61/616,486, filed Mar. 28, 2012, entitled "Using Observations of a Person to Determine if Data Corresponds to the Person," by Monaco et al., the entire contents of which application is incorporated by reference as if fully set forth herein.

The present application is related to U.S. patent application Ser. No. 12/180,502, filed Jul. 25, 2008, entitled "Method and System for Display of Information in a Communication System Gathered from External Sources" and published as U.S. Pat. App. Pub. No. 2009-0031232; U.S. patent application Ser. No. 12/180,489, filed Jul. 25, 2008, entitled "Display of Profile Information Based on Implicit Actions" and published as U.S. Pat. App. Pub. No. 2009-0030940; U.S. patent application Ser. No. 12/180,483, filed Jul. 25, 2008, entitled "Display of Attachment Based Information within a Messaging System" and published as U.S. Pat. App. Pub. No. 2009-0030872; U.S. patent application Ser. No. 12/180,498, filed Jul. 25, 2008, entitled "Display of Information in Electronic Communications" and published as U.S. Pat. App. Pub. No. 2009-0030933; U.S. patent application Ser. No. 12/180,469, filed Jul. 25, 2008, entitled "Display of Communication System Usage Statistics" and published as U.S. Pat. App. Pub. No. 2009-0031244; U.S. patent application Ser. No. 12/180,453, filed Jul. 25, 2008, entitled "Method and System for Collecting and Presenting Historical Communication Data for a Mobile Device" and published as U.S. Pat. App. Pub. No. 2009-0029674; the disclosures of which applications are hereby incorporated herein by reference in their entirety.

FIELD OF THE TECHNOLOGY

At least some embodiments disclosed herein relate to receiving or making observations of a person in general, and more particularly, but not limited to, using such observations to determine whether certain data corresponds to the person.

BACKGROUND

Data mining involves discovering new patterns from large data sets and may involve use of artificial intelligence, statistics and database systems. A typical goal of data mining is to extract knowledge from a large data set. In data mining, large quantities of data typically are automatically analyzed to extract, for example, patterns such as groups of data or dependencies among data.

SUMMARY OF THE DESCRIPTION

Systems and methods to receive or make observations of a person (e.g., a message recipient) that are used to determine whether data (e.g., newly-received data extracted from a message from a sender to the recipient) corresponds to the person are described herein. Some embodiments are summarized in this section.

In one embodiment, a method implemented in a data processing system includes: receiving or making a plurality of observations for a person (e.g., data extracted from e-mails sent to the person); storing the observations in a repository (e.g., a database on a server); and determining whether data in a first observation of the observations corresponds to the person, wherein the determining is based on the plurality of observations.

In one embodiment, the person is associated with an address (e.g., an e-mail address or mobile device phone number), and each of the plurality of observations is a message from the person to a respective recipient of a plurality of recipients. The method further includes storing profile data for each of the plurality of recipients as a plurality of person profiles (e.g., in a different database and/or on a different server, with a unique person profile for each of the recipients), and the determining includes calculating a confidence based on the observations stored in the repository. In one example, the method further includes determining whether the confidence is equal to or greater than a threshold value.

In another embodiment, a method includes: receiving or making a plurality of observations for a sender, the sender having an address; storing the observations in a repository; and determining whether data in a first observation of the observations corresponds to the address of the sender, wherein the determining is based on the plurality of observations.

In one embodiment, the first observation is a first message, the address is an e-mail address, and the data is a phone number. The method further includes extracting the data from the first message, and the determining includes analyzing a distribution pattern of the plurality of observations.

In one embodiment, a privacy policy is implemented in a system to limit use of repository data regarding various persons (e.g., data obtained from sent messages). The system is configured to provide services as described in more detail below while protecting the privacy of the users or other persons (e.g., in accordance with an enrollment agreement and/or user consent). In one example, the above methods include applying a privacy policy to the repository such that a user of a mobile device may only receive a confidence related to data of a sender having previously sent one or more messages to the user.

The present disclosure is illustrative of inventive features to enable a person skilled in the art to make and use the techniques. Various features, as described herein, should be used in compliance with all current and future rules, laws and regulations related to privacy, security, permission, consent, authorization, and others.

The disclosure includes methods and apparatuses which perform the above methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 shows a sample observation parsing and extraction of data from an e-mail, according to one embodiment.

FIG. 7 shows examples of search results returned from the repository in response to a query associated with a person or user, according to one embodiment.

DETAILED DESCRIPTION

Figure 1:
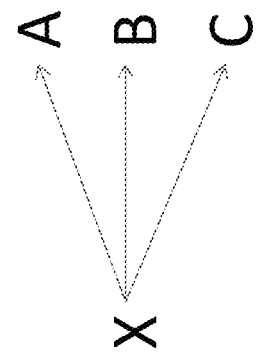
FIG. 1 shows the inference of more complete data based on e-mails sent by person X, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

References made to "Xobni", "Xobni One", and "Elcaro" herein are merely exemplary of specific embodiments and are not intended to limit the scope of the disclosure. For instance, Xobni is presented in some cases as an example of a provider of services that uses the exemplary Elcaro server and Xobni One computing systems/platforms.

At least one embodiment of the disclosure provides a method including: receiving or making, via a first computing device, observations of a person; storing the observations in a repository; and determining whether data in a first observation corresponds to the person, wherein the determining is based on the plurality of observations. For example, observations may be based on data received from another computing device such as data extracted from messages from a sender. In another example, observations may be based on data obtained from a mobile device of the person (i.e., the data can be obtained by making a local observation on the mobile device and does not need to be received from a different computing device such as a server or other user mobile device).

In one embodiment, the method further includes receiving, from a second computing device, a query requesting at least one confidence for ranking a list of data items to be presented on a display (e.g., a screen of a mobile phone) for one of the plurality of recipients. Some examples for computing or calculating the confidence are provided below.

In one example, these recipients are users of the Xobni address book and person profiling services (see, e.g., personal contacts service and software at www.xobni.com, which website information is incorporated by reference herein). In one embodiment, a result from the determining is used to select or rank information from a person profile for presentation to a user of a computing device. In another embodiment, the method further includes using a result from the determining for caller identification (e.g., using the result to rank or prioritize information to be presented to the user of the mobile phone when a caller has been identified). In one embodiment, the person profile is a profile for a caller of a phone call to the user.

In another embodiment, a method includes: receiving or making observations for a sender having an address; storing the observations in a repository; and determining based on the plurality of observations whether data in a first observation corresponds to the address of the sender.

In one embodiment, each of the plurality of observations is a message addressed to a different recipient, and the address is an e-mail address. In one embodiment, the method further includes, prior to the determining whether the data corresponds to the address, determining whether the data was previously sent to a user of a mobile device.

In one embodiment, the method further includes providing a result from the determining only if the sender is in a social network of a user. In one embodiment, the method further includes accessing, over a network, a social network server to determine the social network of the user.

In one embodiment, the method further includes computing a confidence that the data corresponds to the address. The data may be selected from the group consisting of a phone number, a street address, and a company name. As an example, the plurality of observations may be a number of messages from the sender (e.g., at least ten, 100, or 500 messages).

In one embodiment, each of the plurality of observations is an e-mail, a text message, or a phone call. In one embodiment, the repository is a database implemented on at least one server.

In one embodiment, a computing apparatus includes at least one processor and memory storing instructions configured to instruct the at least one processor to perform any of the above methods. In one embodiment, a non-transitory computer-storage medium stores instructions configured to instruct a computing apparatus to perform any of the above methods.

In one embodiment, user data is combined from across a large user base (e.g., person profile data from Xobni service users), to come up with more accurate information about the population as a whole (e.g., the entire Xobni user population and/or the population of persons sending messages to Xobni users). For example, the data may be analyzed to determine which persons are associated with phone numbers in the data (e.g., phone numbers extracted from messages sent to Xobni users are determined or correlated as being the home or mobile phone number of particular senders of the messages).

Figure 13:
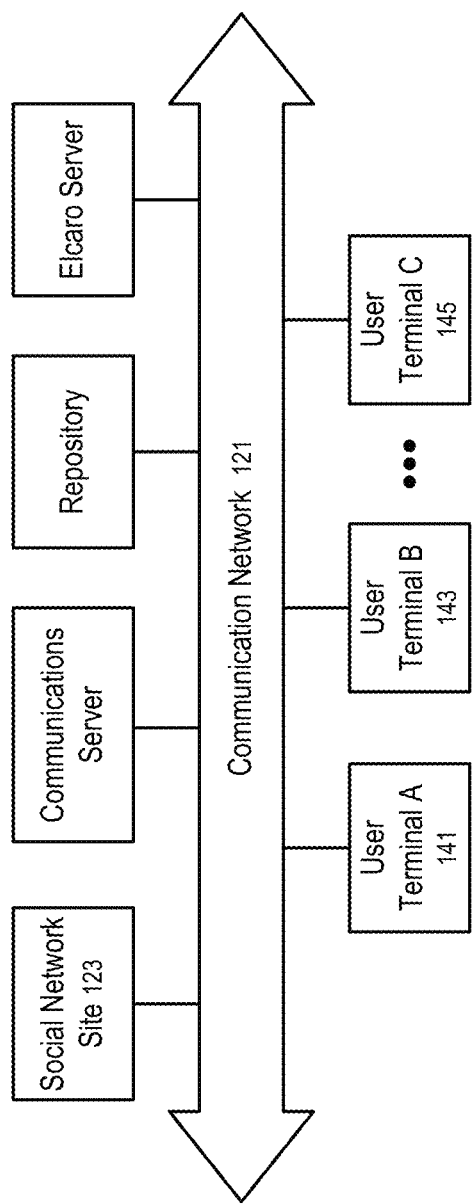
FIG. 13 shows a system to store observations and determine a correspondence of data to a person, according to one embodiment.

FIG. 13 shows a system according to one embodiment to store observations and determine a correspondence of data to a person (e.g., via computation of a confidence or other score of the degree of such confidence) as discussed in more detail below. In FIG. 13, the user terminals (e.g., 141, 143, . . . , 145) may communicate with a communications server and/or an online social network site 123 over a communication network 121. The communications server and/or the social network site 123 each may include one or more web servers (or other types of data communication servers) to communicate with the user terminals (e.g., 141, 143, . . . , 145). In one example, the user terminal is a mobile device such as a smart phone or an iPad or tablet device.

The communications server may store respective person profiles for many users (e.g., of the Xobni service mentioned above) such as recipients of e-mails or other messages from senders (e.g. a sender of an e-mail using a user terminal). The communications server receives or makes observations for a person, and sends these observations to a repository (e.g. via communication network 121). In one example, this repository is implemented as a database running on at least one server connected to communication network 121 (illustrated here and discussed herein merely for exemplary purposes as the "Elcaro server", which is operated for example by the illustrative Xobni service provider). Other computing devices/systems may be used that provide the same or similar functions as illustrated herein for the Elcaro server.

Queries or questions may be submitted from the communications server to the Elcaro server, which may provide results or answers back to the communications server. These queries or questions may be associated with providing an information display or other actions or services for one of many users associated with the communications server (e.g., providing ranked results in a display on a mobile device of a Xobni user).

The online social network site 123 may be connected to a data storage facility to store user provided content, such as multimedia content, preference data, etc. In FIG. 13, the users may use the terminals (e.g., 141, 143, . . . , 145) to send or receive communications, such as e-mails. For example, the communications server may receive a copy of these e-mails, and/or otherwise be involved in the communication of these e-mails. For example, data may be extracted from these e-mails to use in creating a plurality of person profiles for a number of users (e.g., users of the Xobni service). The person profiles are stored on the communications server, or on another computing device (e.g., accessible by or in communication with the communications server). These person profiles may be used to rank or prioritize information presented to a user of a user terminal, and/or other actions or services provided to the user.

Although FIG. 13 illustrates an exemplary system implemented in client server architecture, embodiments of the disclosure can be implemented in various alternative architectures. In some embodiments, a combination of client server architecture and peer to peer architecture can be used, in which one or more centralized servers may be used to provide some of the information and/or services, and the peer to peer network is used to provide other information and/or services. Thus, embodiments of the disclosure are not limited to a particular architecture.

FIG. 1 shows the inference of more complete data based on e-mails sent by person X, according to one embodiment. Person X sends messages to persons A, B, and C. Data can be extracted from each of these messages and sent to the repository. More complete data about person X can be inferred based on these messages. Person X is, for example, a user of the Xobni service mentioned above.

Figure 2:
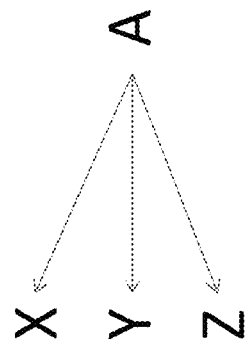
FIG. 2 shows the determination of phone numbers of a person A sending e-mails to existing users X, Y, Z of the Xobni service, according to one embodiment.

FIG. 2 shows the determination of phone numbers of a person A sending e-mails to existing users X, Y, and Z of the Xobni service, according to one embodiment. Person A is, for example, not a member of the Xobni service. In contrast, users X, Y, and Z are users each having a person profile maintained by the Xobni server. This is an example of using crowd-sourcing based on inbound messages to various users of the Xobni service. Data extracted from these messages is sent to the repository. As described below, queries are made to the repository to obtain results used to manage newly-received data associated with one of the person profiles of users X, Y, and Z.

FIG. 3 shows a sample observation parsing and extraction of data from an e-mail, according to one embodiment. Here, the body of an e-mail from Rick to Jason includes various information such as phone number and address data. To create or update a person profile for user Rick, it is desired to determine which of this various information corresponds to Rick.

For example, it is desired to extract the mobile phone number for Rick and update his personal profile with this number. Parsing is used to identify portions of the e-mail body that are believed to be a phone number. As illustrated here, two phone numbers have been extracted. However, only one of these two numbers correctly corresponds to Rick as being his personal cell phone number. As described below, a query is made to the repository to determine which of these two numbers should be selected as correctly corresponding to the person profile for Rick.

Figure 4:
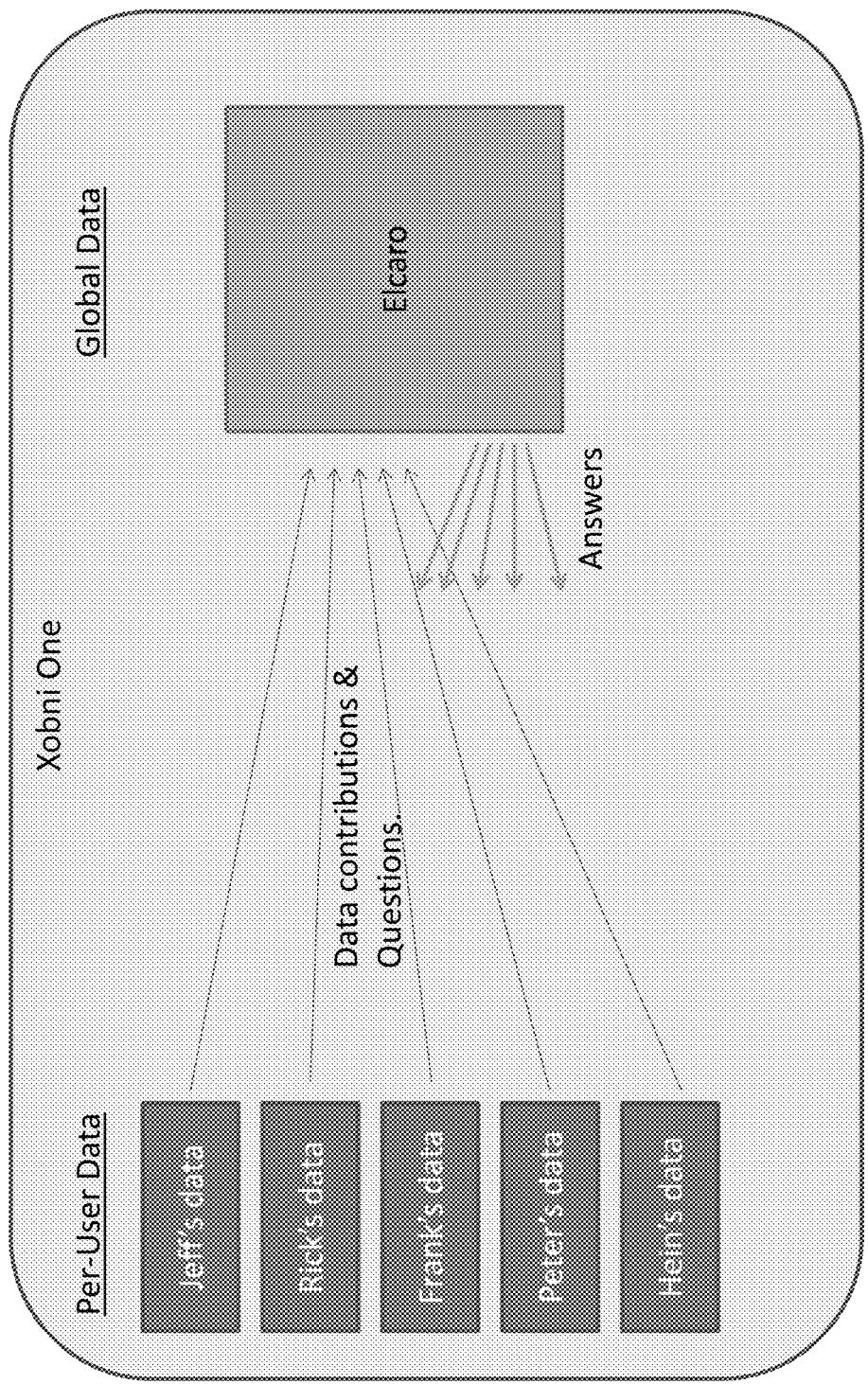
FIG. 4 shows user data for a plurality of users stored as person profiles (for example, Jeff's data and Rick's data) and further shows global data for a large population of persons stored in a repository on a computing device (indicated here as the Elcaro server), according to one embodiment.

FIG. 4 shows user data for a plurality of users stored as person profiles (for example, Jeff's data and Rick's data) and further shows global data for a large population of persons stored in a repository on a computing device (indicated here as the Elcaro server), according to one embodiment. Here, the person profile of user Rick is illustrated as being stored on a user data server along with person profiles for other users. Data is extracted from observations such as phone numbers parsed from messages sent to Rick or communicated to the repository in the Elcaro server. As mentioned above, a query or question may be sent to the repository in order to obtain a result or answer as to whether certain identified data is correlated or associated with a particular user such as Rick. In one embodiment, discussed further below, this result or answer is expressed as a confidence, which may be a numerical score. If the confidence is greater than a predefined threshold value, then the answer is taken as affirmative that the data is correlated to or associated with the particular person.

In one example, the bodies of e-mails are parsed for phone numbers following a set of rules which take into account different countries and formats. The parser can tell if a sequence of numbers is a phone number, but not if it belongs to the sender. At this stage, it is a "raw observation".

Figure 5:
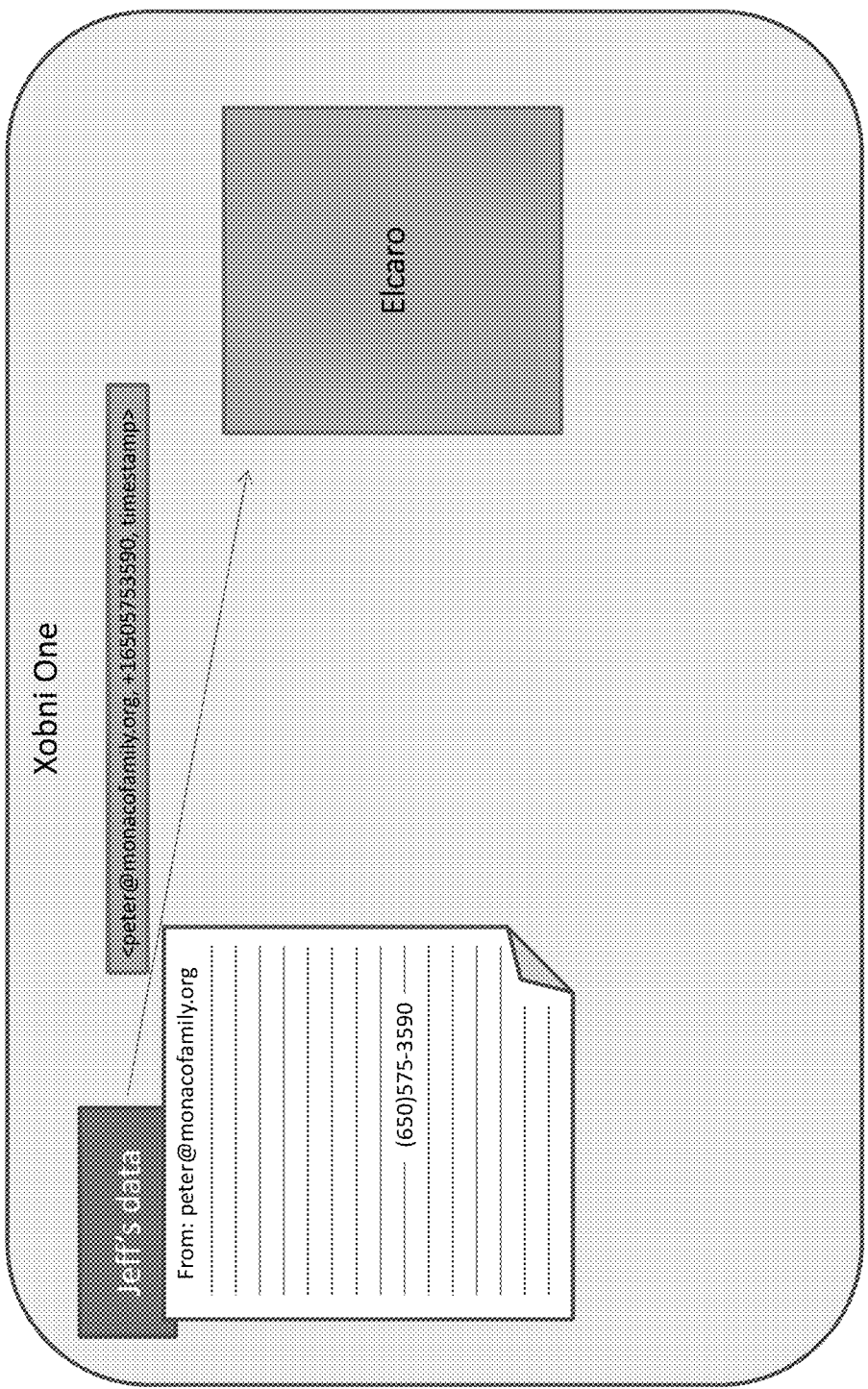
FIG. 5 shows data contributions to the repository from an exemplary message sent from, for example, Peter to Jeff, according to one embodiment.

FIG. 5 shows data contributions to the repository from an exemplary message sent from, for example, Peter to Jeff, according to one embodiment. Here, user Jeff has received a message from Peter that contains data such as Peter's e-mail address, a phone number extracted from the body of the e-mail, and a timestamp. It is desired to determine whether this phone number is associated with the sender of the message, Peter. The address, the phone number, and the timestamp are sent as a data contribution to the repository.

Figure 6:
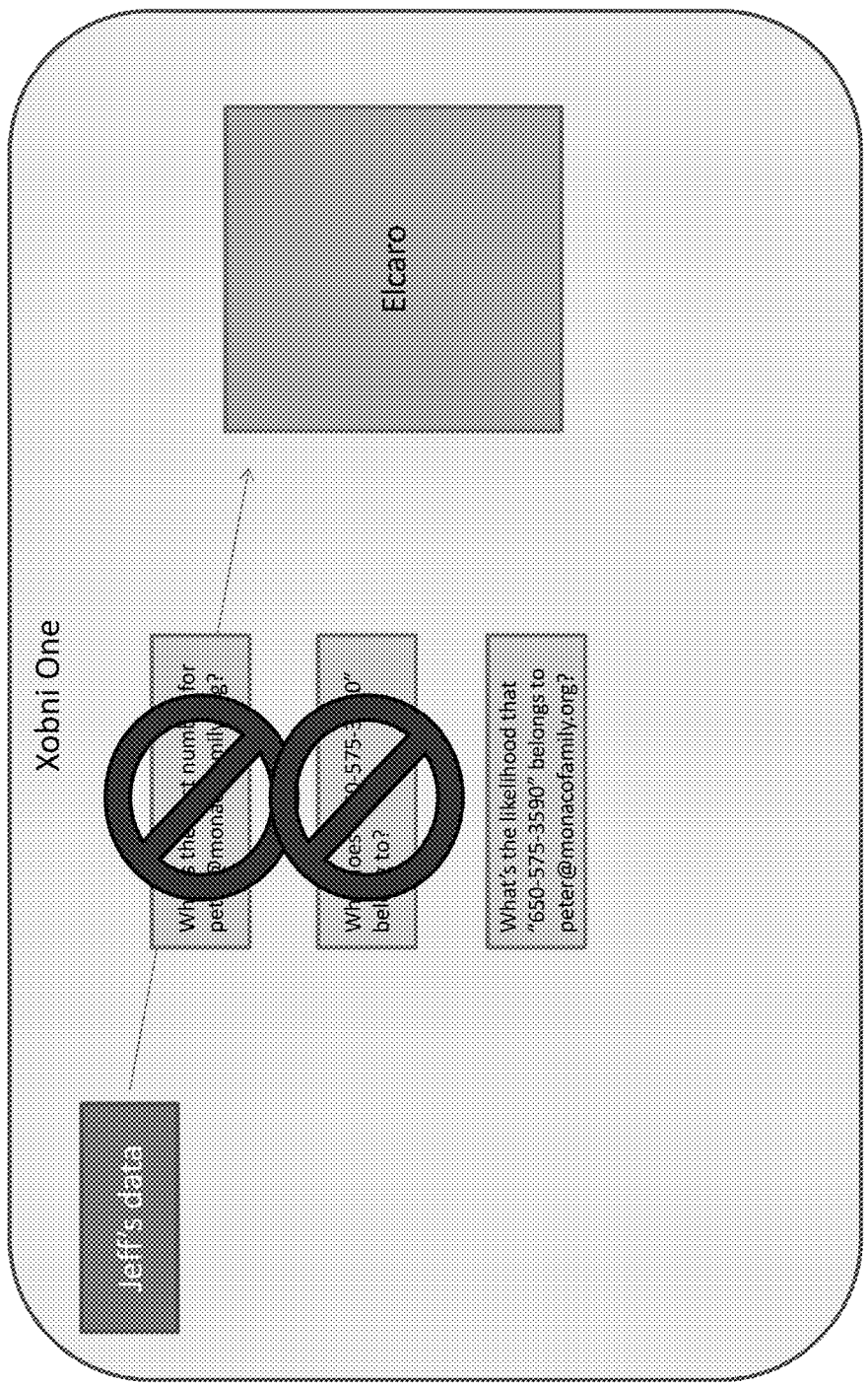
FIG. 6 shows enforcement of a privacy policy via an application program interface (API), according to one embodiment.

FIG. 6 shows enforcement of a privacy policy via an application program interface (API), according to one embodiment. More specifically, the API prohibits certain types of queries. For example, user Jeff is not permitted to access data from the repository that provides the phone number for the sender Peter. Also, user Jeff is not permitted to access data indicating the person for which the extracted phone number belongs to. Instead, user Jeff is limited to a query regarding whether the extracted phone number belongs to or is associated with the sender Peter.

Figure 7:
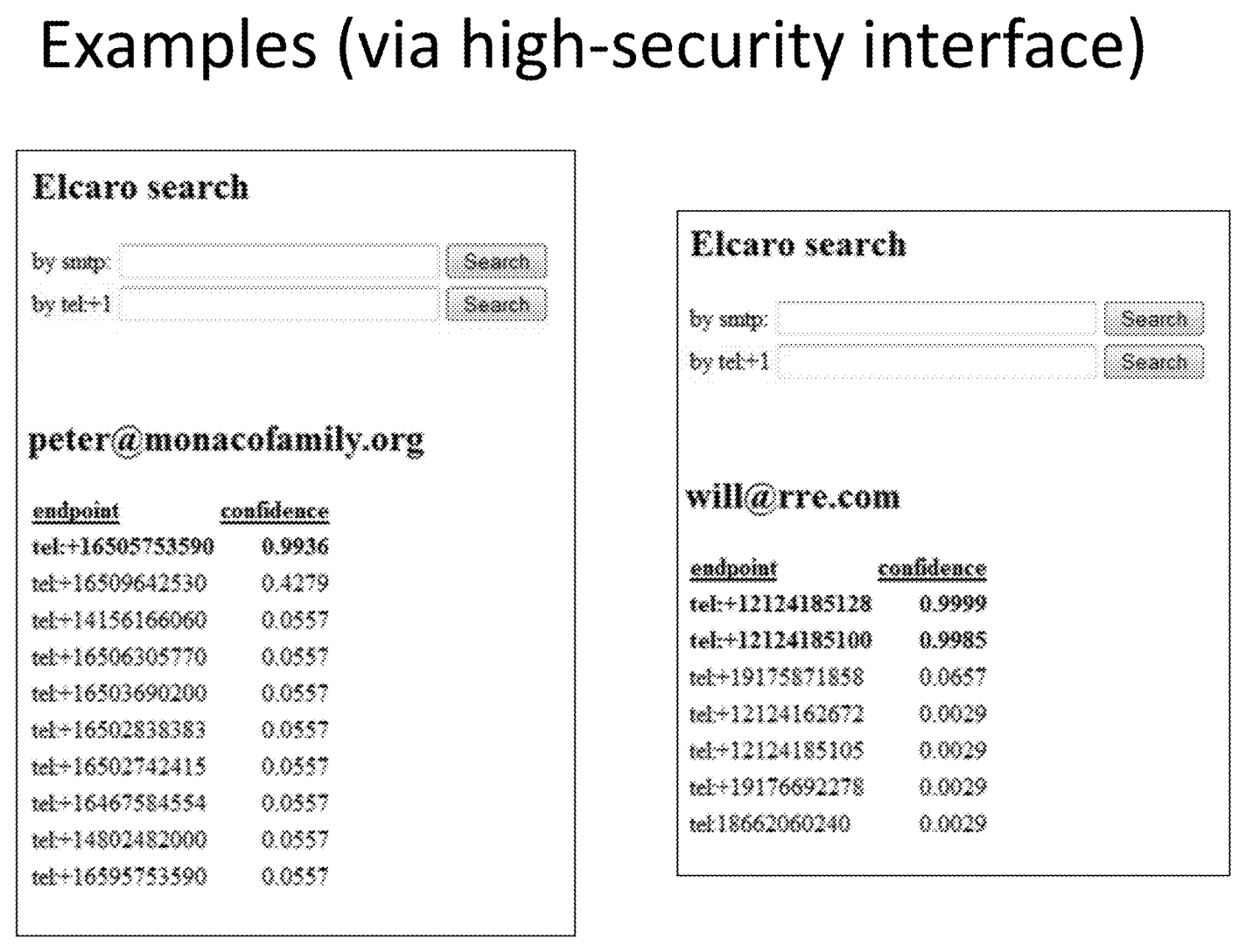

FIG. 7 shows examples of search results returned from the repository in response to a query associated with a person or user, according to one embodiment. Each of the search results illustrated here provides a confidence for each of several phone numbers previously extracted from messages to a user. For example, a first phone number '590 has a confidence score of 0.9936, whereas a second '554 phone number has a confidence score of 0.0557. The '590 phone number is greater than a threshold value of, for example, 0.98 and is thus deemed to be a phone number that is associated with the sender Peter. The '554 phone number is below the threshold value and is deemed to be not related to the sender Peter.

In one example of a confidence algorithm, a statistical analysis is performed across every unique e-mail address that assigns a confidence value to each unique phone number observed from the address. For example, there may be more than 0.5 billion observations in the repository database. A person may have one or many valid phone numbers. An algorithm determines how many extracted numbers actually belong to the person despite the large variation and quantity of observations made across the system.

Figure 8:
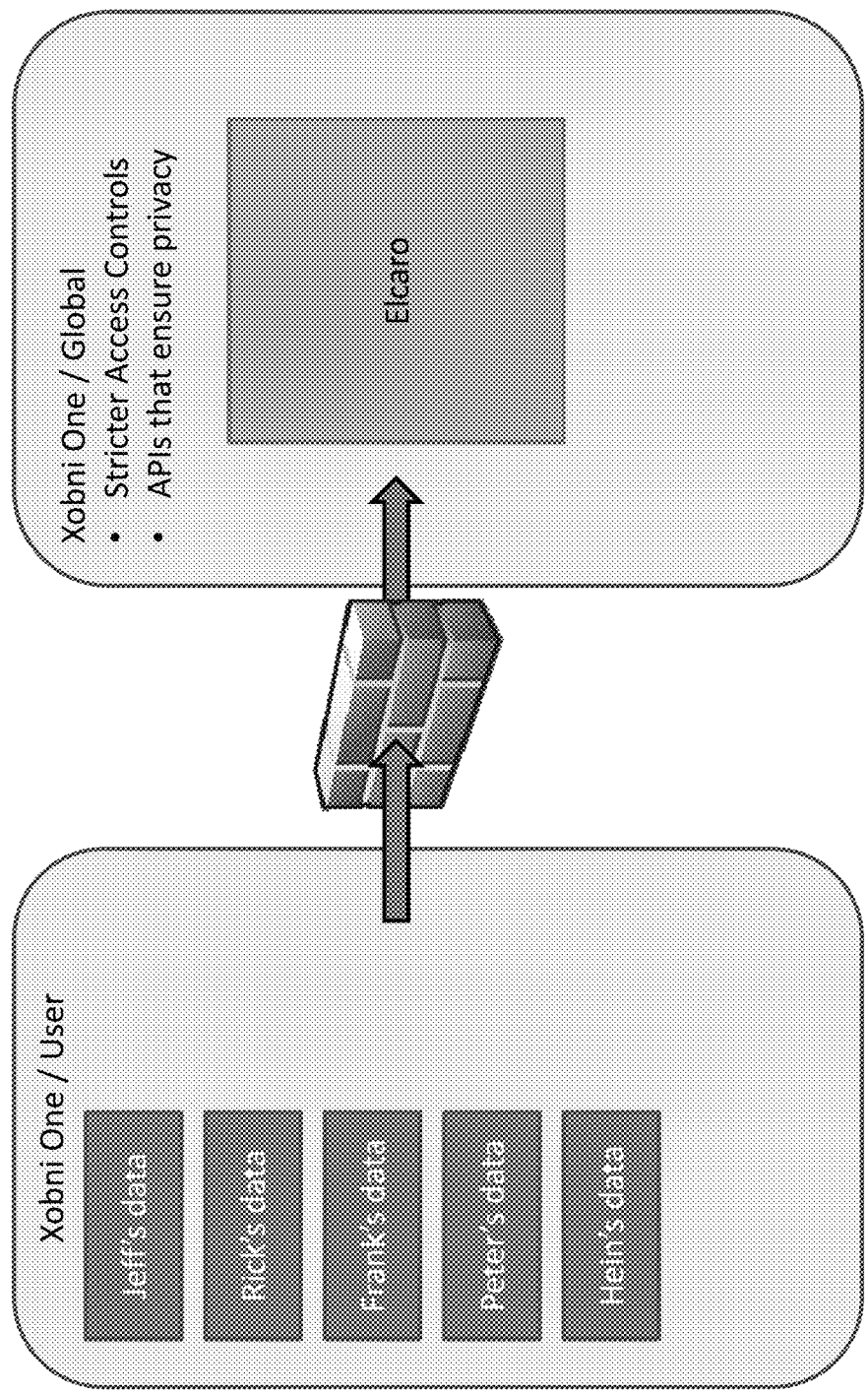
FIG. 8 shows implementation of access controls to ensure privacy of data for persons stored in the repository on the Elcaro server, according to one embodiment.

FIG. 8 shows implementation of access controls to ensure privacy of data for persons stored in the repository on the Elcaro server, according to one embodiment. Queries made to the repository take privacy into account, and a firewall is set up between user data and the server storing the repository. Specifically, in one specific approach, a result to a query regarding a phone number for a person is only provided to a user if that person is a part of the user's social network (e.g., as determined by a data stored on the person profile server, a different server, or a third party social network server). This privacy setting is applied to the global person data in the repository.

For example, consider the case where a user John has been e-mailed numerous phone numbers over the past few years by many different senders. The e-mail addresses of the senders having sent the e-mails to the user John are applied as a filter against all of the data in the repository. So, the user only gets access to results from the repository for those phone numbers that are associated with these prior e-mail addresses. The user does not get access to new phone numbers not previously known to the user. In other words, the global database repository of everyone's phone number and how each phone number is correlated to an e-mail address or person is filtered based on privacy controls for each individual user.

Figure 9:
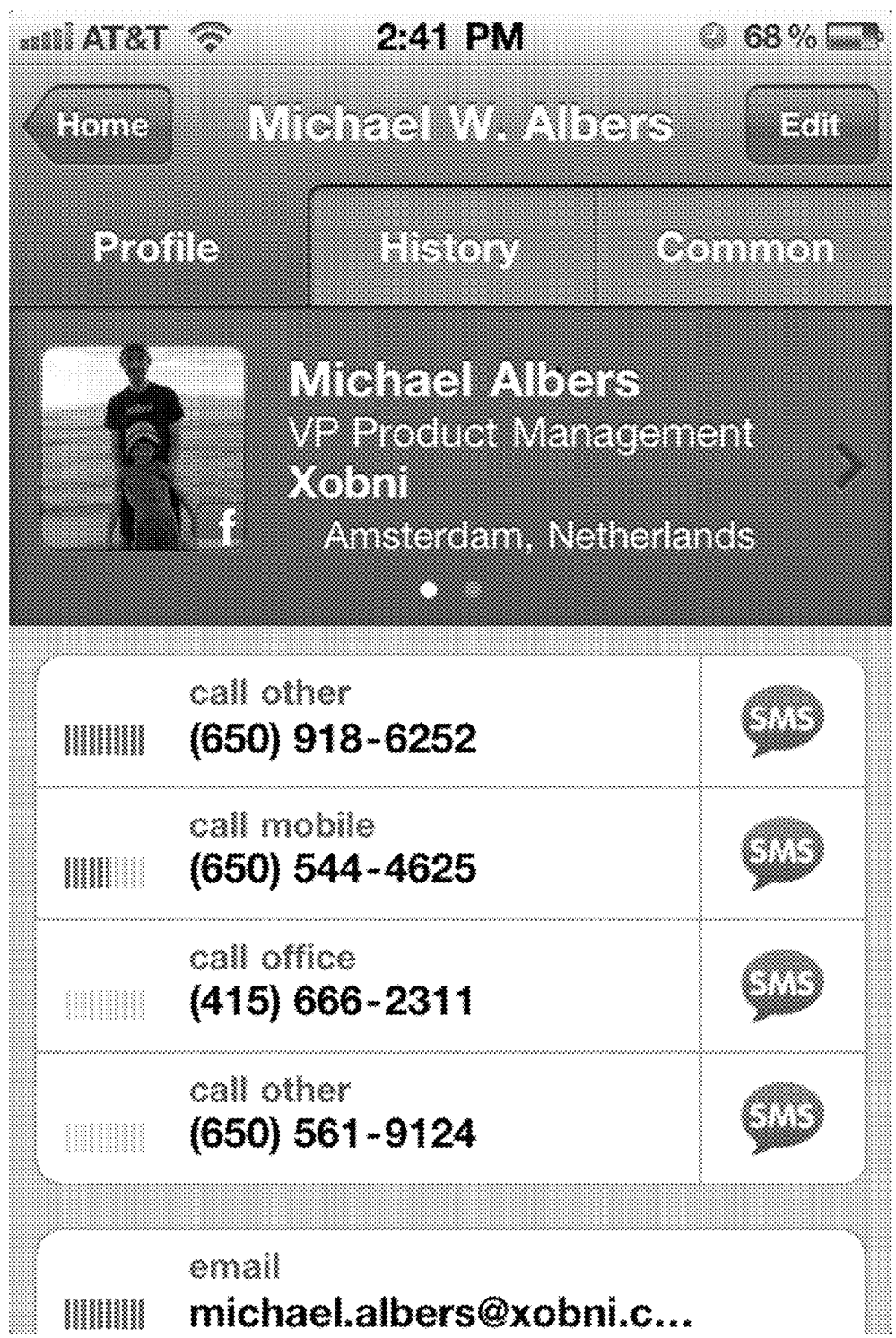
FIG. 9 shows a screen shot of a display of a user mobile device, according to one embodiment.

FIG. 9 shows a screen shot of a display of a user mobile device, according to one embodiment. The display presents a person profile for person Michael Albers, who may be a sender of a message to a user, or may be a person who has been identified as a caller to the user as part of a caller identification system.

The displayed profile lists phone numbers that are presented to the user in a ranked order. Confidence scores generated (e.g., by the Elcaro server storing the repository) are used to rank the phone numbers, and the numbers are displayed to the user in this ranked order. When the list of highest confidence phone numbers (e.g., numbers above the predefined threshold discussed above) is displayed, a signal strength indicator may be provided to indicate the confidence value associated with each phone number. As illustrated here, the signal strength indicator may be a horizontal bar graph indicating the magnitude of the confidence.

In one embodiment, note that if a user himself or herself directly enters a phone number into a contact database or a person profile, then it is assumed (e.g., by the Elcaro server and the person profile server) that the user wants this number associated with the profile of that particular person. So, any confidence score is ignored, and the phone number is treated as being associated that person.

Now, further details are discussed below for various additional non-limiting, exemplary embodiments. In one embodiment, a process may determine whether a phone number and an e-mail address belong to the same person by crowd sourcing communication data as discussed above. More specifically, one can compute the confidence that a phone number found in the body of an e-mail belongs to the sender of the e-mail. By setting a specific cutoff value for the "confidence", one can confirm ownership of the phone number with greater accuracy, if there is sufficient data.

In one example, users of an address/contact service may agree to allow servers to access their e-mail corpus. Since their e-mail corpus includes received e-mails, a system can gather phone number observations from persons who are not a registered user. However, privacy constraints only permit access to this inferred (outsider) phone number data if and only if the person is in the user's network (which may be defined in various conventional ways, such as being a second-order social network). For inbound messages, when friends of a person A join the Xobni service, the friends will have immediate access to correct phone information, without having to wait for person A to join the Xobni service, or respond to a request for person A to provide up-to-date phone numbers.

In one example, data for many persons is globalized. Cleaning up phone numbers for the persons can be done using the method described above. When large numbers of phone numbers are extracted from many e-mails, a system may associate too many phone numbers with a particular person/contact. Persons usually only have one or two primary phone numbers that they use. The approach above permits displaying the most significant phone numbers. A process determines whether a phone number and an e-mail address belong to the same person. This can be done by scanning the entire repository of all phone numbers that have ever been observed through the system (e.g., via messages or other observations).

A number is computed that is called a "confidence". When a phone number and an e-mail are paired as an observation, a query is made as to determine the confidence that the phone number belongs to the sender. A threshold is defined, and if the confidence is above that threshold, it is assumed that the phone number is associated with the person, and every number below that threshold is assumed not to be associated.

Regarding inbound e-mails from non-Xobni users, the Xobni service stores a large number of e-mails from some outside users that are sent to multiple existing Xobni service users. The more samples the system has, the greater the confidence that it can be determined that a phone number is that particular outside user's phone number. For example, if the system sees three or four samples, the system starts to consider that the phone number is associated with that person. Having greater than, for example, fifty samples is an example of greater confidence.

In one embodiment, the neighboring words in an e-mail may be used to determine the phone number type, but are not used to determine the correlation with the e-mail address or the person. As a first step, the parser looks at things like whether a number is an international number or a domestic number. If so, the parser will extract it. After identifying a number, the parser may look at a few words to the left or right to find words like "home" or "fax" in order to identify the type of number. A person may have his or her main number in the signature block of an e-mail, but occasionally the person may put his or her mobile number in the body of an e-mail. The system is able to identify that mobile number from the body of the e-mail. However, for example, the number of a favorite restaurant of a person may also be put into an e-mail. The system is able to avoid associating that restaurant number with the sender.

The method above may be applied to any type of messaging, including, for example, text messaging. This may also include Facebook or similar messages. Data to be identified or confirmed with a confidence may include, for example, a birth date, an address, or other personal or business data such as employer. These might be considered to be attributes of the sender. These attributes are determined based on a large number of communications by that person.

Figure 10:
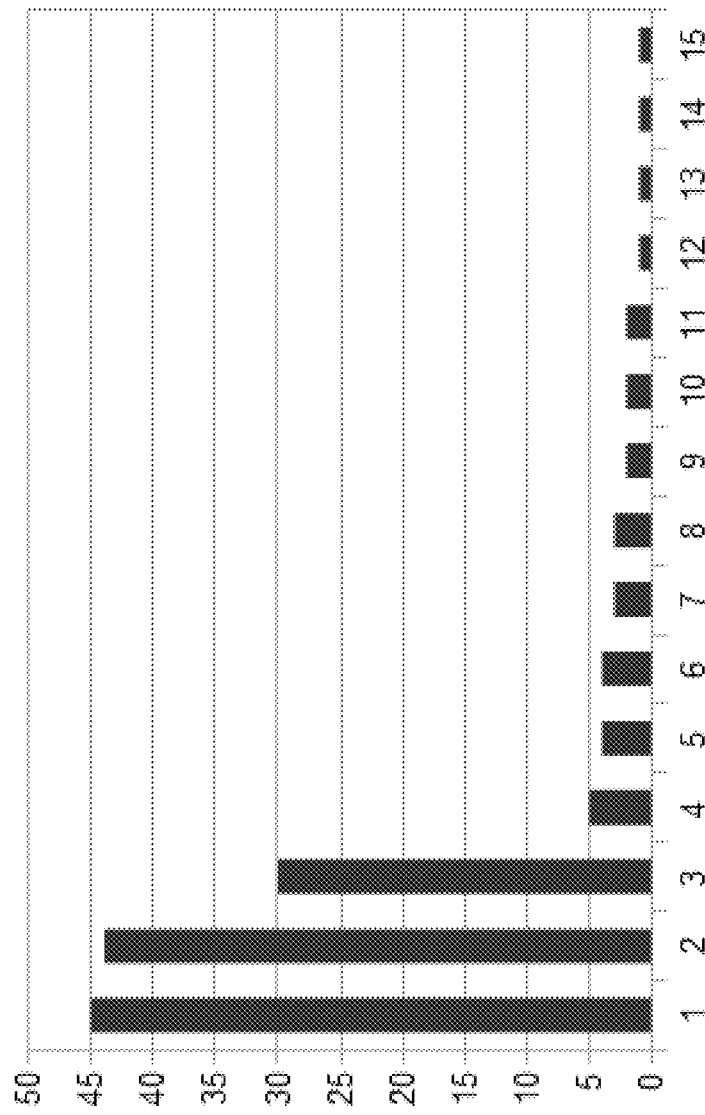
FIG. 10 shows a distribution of phone numbers extracted from sender messages where the distribution has a long tail, according to one embodiment.

Regarding a distribution of observations for a particular sender, there is a pattern to the distribution that may be analyzed by an algorithm. FIG. 10, which is discussed in greater detail below, is an example of such a distribution. The distribution in FIG. 10 is assembled as follows: All observations discovered by the system are stored in a repository (as discussed above). From this repository, all observations from a particular sender are fetched, and then a count is made of the number of these observations that were sent from each phone number.

Some persons might have four phone numbers, while other persons have only one number. The algorithm draws out the distribution, and cuts it at the appropriate point (this is described in greater detail below). For example, it might be determined that a first user has two numbers, and another user only has a single number (such as a Skype number). It can't be assumed that every person has two phone numbers. Instead, the number of phone numbers will vary for each user. The approach herein can use e-mails from all users in the repository and apply the algorithm to just one person to make a decision. In one embodiment, each message from a sender is treated the same (i.e., as an observation). Each of these observations is summed up as described below. The computed confidence is based on the shape of the distribution. Typically, the distribution has a long tail.

One application of the approach above is that a system could take an iPhone or other address book, and without adding or subtracting any further data, the system could rank the phone numbers or other data in the address book, and clean up the data to indicate which phone number or other data item is currently the best number, and which number or data item may no longer be correct. Thus, accuracy of this address or other data can be increased.

Other applications of computing confidence as discussed herein may include mapping of e-mail addresses to social network IDs. For example, it may be determined that a certain e-mail address belongs to a particular person on Facebook or another social network site.

Another application includes identification of known entities (e.g., a company such as Amazon.com). When a person receives an e-mail from Amazon.com, the e-mail may be from a sender having a name repeated for numerous customers, but sent from the same Amazon.com domain. The system may look at several e-mails, and determine that it is Amazon.com that is sending e-mails to lots of customers (the e-mails look alike in structure). So, a determination is made that the sender is a business entity, and not a human person.

Another application is to build a global social graph (for the system to understand who knows whom, for example similarly to the understanding that the Facebook system has based on collected/stored data). For example, a person may have about 10 or 20 unique phone numbers. If a "person" has a very large number, for example 100,000, of unique phone numbers, then the system assumes this is merely an Internet bot.

A specific algorithm in one embodiment for confidence scoring phone numbers is now discussed. Worker jobs run continuously on Xobni system clusters that fetch historical e-mails from Xobni users in batches. The bodies of the e-mails are not stored, but instead scanned once and discarded. More specifically, in one embodiment, the Elcaro server uses programs running on computers physically located at an external facility. There are two different jobs:
1) gathering observations from e-mails and placing them into the repository; and
2) running statistics on the observations in the repository, as described in more detail below. These processes run in parallel (i.e., they are always both running simultaneously and do not interfere with each other).

During a scan, a set of regular expressions and specific parsing rules are run on each e-mail to identify and extract phone numbers. Each such extraction is referred to as an "observation". This process is not designed to be perfect, and instead generally errs on the side of false positives (i.e., assuming it's a phone number if there is uncertainty).

Once an observation has been made, it is stored in the repository (e.g., a MySQL database). The database keeps track of all the unique e-mail addresses it has seen, all the unique phone numbers it has seen, and all unique observations. An observation must be unique along three fields (email_address, phone_number, email_timestamp), which prevents double counting, in case the same e-mail is re-scanned in the future.

After the observation has been inserted into the database, the source e-mail address is marked as "dirty", which has the meaning that the entire set of unique phone number confidences for this e-mail address is out-of-date and must be re-computed. This is done because one observation will affect the confidence scores of all other phone numbers observed from this source e-mail address.

In one embodiment, a separate process (running in parallel to the observation importer) cleans up dirty e-mail addresses as now described. For each e-mail address, the following steps are performed:
1) Scale all observations with a decay function, making older ones less important. For example, the decay function may have a half-life of 26 weeks (i.e., the observation is 50% as important if 26 weeks old, 25% as important if 52 weeks old, etc.).

2) Insert artificial noise to prevent degenerate statistical cases and smooth out the results. For every real observation at time t, a fake observation at time t is added. Also, the count of all real observations is increased by one. This ensures that the standard deviation is always computable.

3) Sum all the decayed values for each unique phone number (real and fake). Each phone number for this e-mail address now has a "decayed score".

4) Determine the mean and standard deviation of the decayed scores.

5) For each phone number, compute the distance of its decayed score from the mean decayed score in standard deviations (s).

6) Apply a squashing function to s, so the range is restricted to [−1, 1]. This is the "confidence" that the phone number belongs to the e-mail address. The squashing function used is the Logistic Squashing function (http://en.wikipedia.org/wiki/Logistic_function) $f(x)=1/(1+e^{-x})$ which scales to the range [0, 1]. This is then re-scaled to [−1.0, 1.0] for use in this embodiment.

7) Flag any phone numbers with a confidence greater than a certain cutoff value (e.g., empirically determined to be 0.38) to be "significant", meaning the Elcaro server/system believes with high confidence that the phone number belongs to the sender of the e-mail.

All confidences are then updated into a separate database table, which is the "master record" of confidences. This table is indexed for fast-read by Xobni service APIs, so client applications can ask the Elcaro server/system for the confidence of an (email_address, phone_number) pair, then use this information to either remove the number (in the case of a low confidence), or for ranking a set of phone numbers or other data.

To protect privacy, the client application may only ask the Elcaro server/system about phone numbers that it is already aware of. If user X has sent user Y an e-mail with phone number P in it, then user Y may ask the Elcaro server/system what is: confidence (X,P)? This protects user X's privacy, while simultaneously giving user Y the benefit of the global knowledge contained in the confidence score.

FIG. 10 shows a distribution of phone numbers extracted from sender messages where the distribution has a long tail, according to one embodiment. For every unique phone number that is sent from a user, there is a rectangle placed on the X axis (horizontal axis) of FIG. 10. The height of each rectangle represents the number of times that the number has been seen. It is a standard histogram, such as for example found at (http://en.wikipedia.org/wiki/Histogram). In FIG. 10, the rectangles are arranged from highest to lowest, for simplicity, but only the height is of relevance here (the particular arrangement of the rectangles along the X axis is not critical).

The "fake" observations discussed above are necessary to handle degenerate statistical cases. The confidence score assumes there is a distribution of phone numbers with a long tail: a few numbers with a lot of observations, then lots of observations of different (incorrect) phone numbers (see, e.g., FIG. 10). If this assumption is true, then the system can use the mean and standard deviation to compute the confidence as described above.

Figure 11:
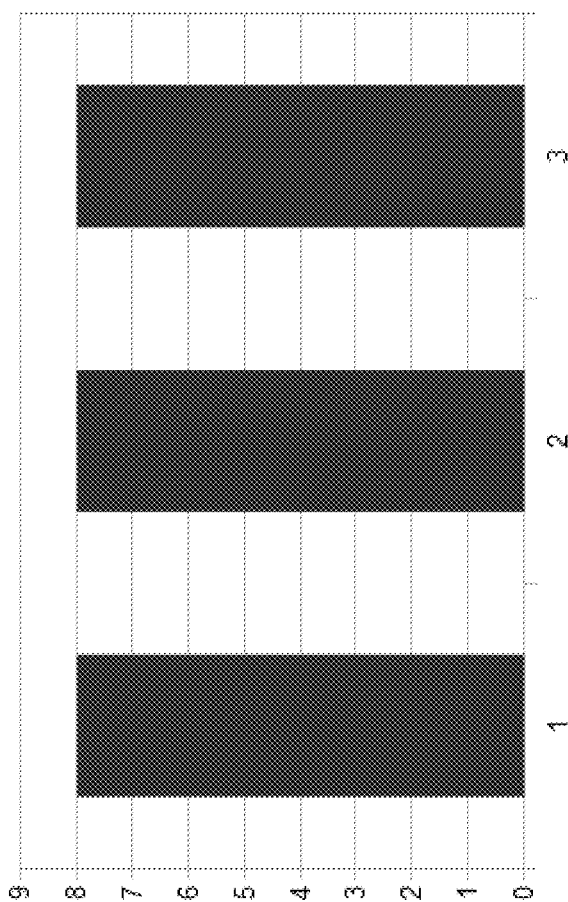
FIG. 11 shows a distribution where the same phone number has been observed eight times, according to one embodiment.

The assumption holds true in practice most of the time, but the system must handle cases when the assumption breaks down. A simple example is as follows: one has observed the same phone number eight times and that is all of the observations. Most likely, this number belongs to the sender, but without any other phone numbers to compare it to (no distribution), one can't compute the standard deviation, and thus neither the confidence. This is also true if one has seen several different numbers exactly the same number of times (e.g., WORK, CELL, HOME phone numbers in eight e-mails). Here again, the standard deviation is zero, and the confidence unexpectedly cannot be computed. For example, see FIG. 11, which shows a distribution where the same phone number has been observed eight times, according to one embodiment.

If the system does the following steps:
1) add a fake data point for each real data point; and
2) increase the number of real observed data points by one;

Then the system is guaranteed that:
1) the confidence is computable in all cases (e.g., the standard deviation is greater than zero); and
2) all confidences are comparable in the same range (e.g., rankable).

Figure 12:
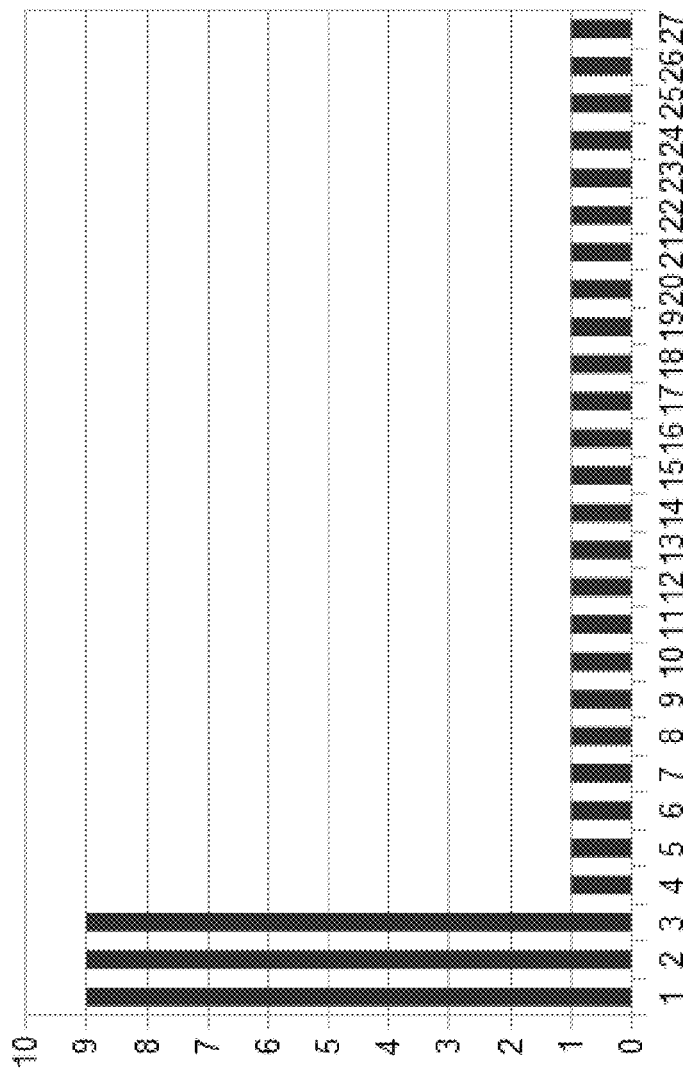
FIG. 12 shows a distribution to which so-called "fake" observations have been added to handle degenerate statistical cases, according to one embodiment.

Note that step 2) above is only done for real data points. This ensures that the number of observations for each phone number can never all be equal (e.g., there will always be more real observations of a phone number than of a fake phone number). This ensures that the standard deviation is always computable. Also, see, for example, FIG. 12, which shows a distribution to which "fake" observations have been added to handle degenerate statistical cases, according to one embodiment.

In addition, the real data point is scaled based on the decay function (e.g., older is less important), so the fake data point must also be scaled with the same decay function so as not to introduce a bias to the long tail. It should be noted that if the fake data points were not scaled the same way as the real data points, then the distribution would be biased towards fake data. For example, a real data phone number observed 26 weeks ago would be scaled by 0.5. A fake data point is then added to create the long tail, but this data point must also be scaled by 0.5. If it were not scaled (e.g., if it were just kept at the default 1.0), then this would be equivalent to adding two fake data points. Essentially, both real and fake data points are scaled the same way for the sake of consistency.

Figure 14:
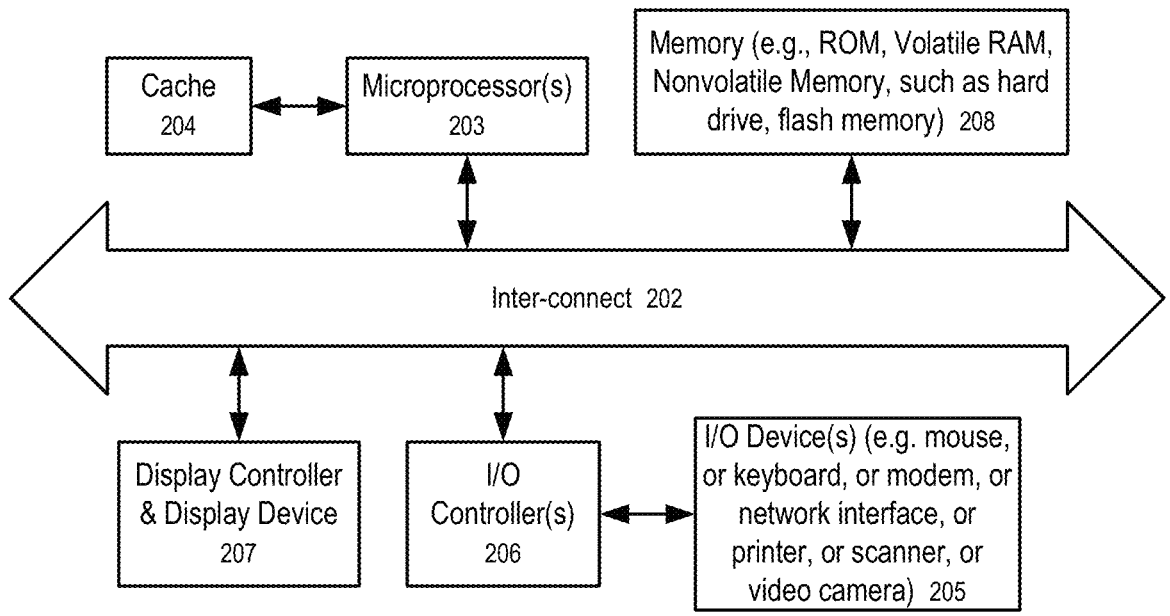
FIG. 14 shows a block diagram of a data processing system which can be used in various embodiments.

FIG. 14 shows a block diagram of a data processing system which can be used in various embodiments (e.g., for implementing one or more components illustrated in FIG. 13). While FIG. 14 illustrates various components of a computer system, it is not intended to represent any particular architecture or manner of interconnecting the components. Other systems that have fewer or more components may also be used.

In FIG. 14, the system 201 includes an inter-connect 202 (e.g., bus and system core logic), which interconnects a microprocessor(s) 203 and memory 208. The microprocessor 203 is coupled to cache memory 204 in the example of FIG. 14.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 14 is used to implement the communications server and/or an online social network site of FIG. 13, and/or other servers, such as a server to implement the repository and/or Elcaro server(s) of FIG. 13.

In one embodiment, a data processing system as illustrated in FIG. 14 is used to implement a user terminal, which may receive or send messages to or from users or recipients each having a person profile stored on or managed by communications server. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 15:
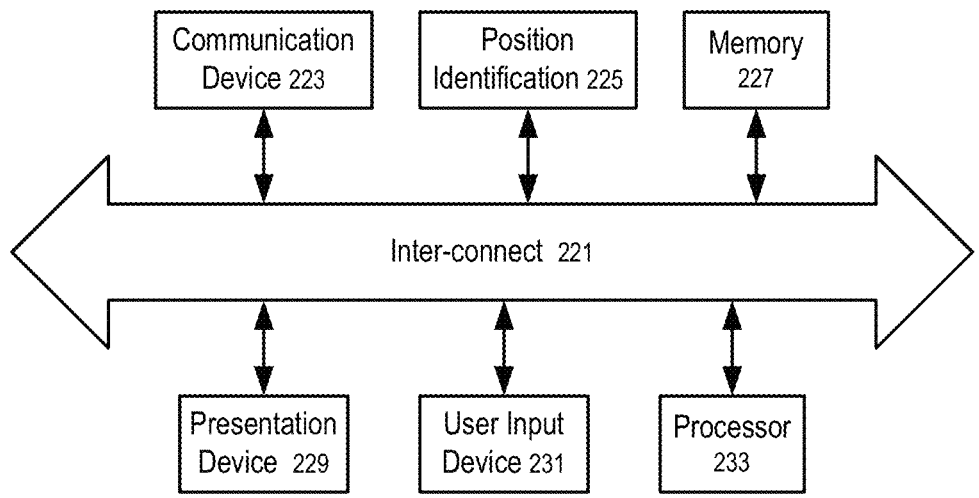
FIG. 15 shows a block diagram of a user device according to one embodiment.

FIG. 15 shows a block diagram of a user device according to one embodiment. In FIG. 15, the user device includes an inter-connect 221 connecting the presentation device 229, user input device 231, a processor 233, a memory 227, a position identification unit 225 and a communication device 223.

In FIG. 15, the position identification unit 225 is used to identify a geographic location for a user. The position identification unit 225 may include a satellite positioning system receiver, such as a Global Positioning System (GPS) receiver, to automatically identify the current position of the user device. In FIG. 15, the communication device 223 is configured to communicate with the communications server, or an online social network.

In one embodiment, the user input device 231 is configured to generate user data content. The user input device 231 may include a text input device, a still image camera, a video camera, and/or a sound recorder, etc. In one embodiment, the user input device 231 and the position identification unit 225 are configured to automatically tag user data content created by the user input device 231 with the navigation information identified by the position identification unit 225.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, via a computing device, a plurality of messages from a first person;
   extracting data from each of the messages, the data including first contact data associated with the first person, wherein the first contact data is extracted from a first message;
   storing the extracted data from each of the messages in a repository;
   after storing the extracted data, receiving a new message from the first person, the new message comprising the first contact data associated with a first user in a body of the new message, and the new message further comprising second contact data associated with a second user in the body of the new message;
   extracting the first contact data and the second contact data from the new message to provide new data;
   sending at least one query to the repository, the at least one query comprising the new data extracted from the new message and an identity of the first person;
   in response to the at least one query, receiving, from the repository, at least one search result including a first confidence score corresponding to the first contact data and indicating a confidence that the first contact data corresponds to the first person and a second confidence score corresponding to the second contact data and indicating a confidence that the second contact data corresponds to the first person;
   based on the at least one search result including the first and second confidence scores, determining, via a computing device, which of the first contact data and the second contact data in a body of the new message to use to update a profile for the first person; and
   in response to determining that the first confidence score satisfies a threshold value indicating that the first contact data extracted from the body of the new message corresponds to the first person and determining that the second confidence score fails to satisfy the threshold value, updating the profile for the first person using the first contact data, the profile comprising contact details for the first person.

2. The method of claim 1, further comprising storing profile data for each of a plurality of recipients of the messages as a plurality of person profiles.

3. The method of claim 1, wherein the first confidence score and the second confidence score are compared to the threshold value.

4. The method of claim 1, further comprising receiving, from a computing device, a query requesting at least one confidence score for ranking a list of data items for one of the plurality of recipients to be presented on a display.

5. The method of claim 1, further comprising using the at least one search result for caller identification.

6. The method of claim 1, further comprising prior to the determining which of the first contact data and the second contact data corresponds to the first person, determining whether the first contact data was previously sent to a user of a computing device.

7. The method of claim 1, wherein the first contact data is a phone number extracted by following at least one rule based on country formatting for phone numbers.

8. A non-transitory computer-storage medium storing instructions configured to instruct a computing apparatus to:
   receive, via the computing apparatus, a plurality of messages from a first sender;
   extract data from each of the messages, the data including first contact data associated with the first sender, wherein the first contact data is extracted from a first message;
   store the extracted data from each of the messages in a repository;
   after storing the extracted data, receive a new message from the first sender, the new message comprising the first contact data associated with a first user in a body of the new message, and the new message further comprising second contact data associated with a second user in the body of the new message;
   extract the first contact data and the second contact data from the new message to provide new data;
   send at least one query to the repository, the at least one query comprising the new data extracted from the new message and an identity of the first sender;
   in response to the at least one query, receive, from the repository, at least one search result including a first confidence score corresponding to the first contact data and indicating a confidence that the first contact data corresponds to the first sender and a second confidence score corresponding to the second contact data and indicating a confidence that the second contact data corresponds to the first sender;
   based on the at least one search result including the first and second confidence scores, determine, via the computing apparatus, which of the first contact data and the second contact data in a body of the new message to use to update a profile of the first sender; and in response to determining that the first confidence score satisfies a predetermined threshold value indicating that the first contact data extracted from the body of the new message corresponds to the first sender and determining that the second confidence score fails to satisfy the threshold value, update the profile for the first sender using the first contact data, the profile comprising contact details for the first sender.

9. The computer-storage medium of claim 8, wherein an address of the first sender is an e-mail address, the first contact data is a phone number and the first confidence score indicates a correspondence between the address and the phone number.

10. The computer-storage medium of claim 8, wherein the determining which of the first contact data and the second contact data in the new message corresponds to the first sender further comprises analyzing a distribution pattern of the plurality of messages, wherein the distribution pattern comprises phone numbers extracted from the plurality of messages.

11. The computer-storage medium of claim 8, wherein the instructions are further configured to instruct the computing apparatus to, prior to determining that the first contact data corresponds to the first sender, determine whether the first contact data was previously sent to a user of a mobile device.

12. The computer-storage medium of claim 8, wherein the instructions are further configured to instruct the computing apparatus to apply a privacy policy to the repository such that a user of a mobile device may only receive a confidence score related to data of a sender having previously sent one or more messages to the user.

13. The computer-storage medium of claim 8, wherein the instructions are further configured to instruct the computing apparatus to compute a confidence that the first contact data corresponds to an address of the first sender.

14. The computer-storage medium of claim 8, wherein the first contact data is a phone number, a street address, or a company name.

15. The computer-storage medium of claim 8, wherein the number of messages received from the first sender is at least ten.

16. A system, comprising:
at least one processor; and
memory storing instructions configured to instruct the at least one processor to:

receive a plurality of messages from a first person;
store data extracted from each of the messages in a repository, the data including first contact data associated with the first person, wherein the first contact data is extracted from a first message;
after storing the data extracted from each of the messages, receive a new message from the first person, the new message comprising the first contact data associated with a first user in a body of the new message, and the new message further comprising second contact data associated with a second user in the body of the new message;
extract the first contact data and the second contact data from the new message to provide new data;
send at least one query to the repository, the at least one query comprising the new data extracted from the new message and an identity of the first person;
in response to the at least one query, receive, from the repository, at least one search result including a first confidence score corresponding to the first contact data and indicating a confidence that the first contact data corresponds to the first person and a second confidence score corresponding to the second contact data and indicating a confidence that the second contact data corresponds to the first person;
based on the at least one search result including the first and second confidence scores, determine which of the first contact data and the second contact data in a body of the new message to use to update a profile for the first person; and
in response to determining that the first confidence score satisfies a threshold value indicating that the first contact data extracted from the body of the new message corresponds to the first person and determining that the second confidence score fails to satisfy the threshold value, update the profile for the first person using the first contact data, the profile comprising contact details for the first person.

17. The system of claim 16, wherein the at least one search result is used to rank information from a person profile for presentation to a user of a computing device, and wherein the person profile is for a caller of a phone call to the user.

18. The system of claim 16, wherein each of the plurality of messages is an e-mail or a text message.

19. The system of claim 16, wherein the repository is a database implemented on at least one server.

\* \* \* \* \*